May 27, 1952     J. W. MECKENSTOCK     2,598,409
SAND VALVE
Filed Dec. 15, 1949                         2 SHEETS—SHEET 2
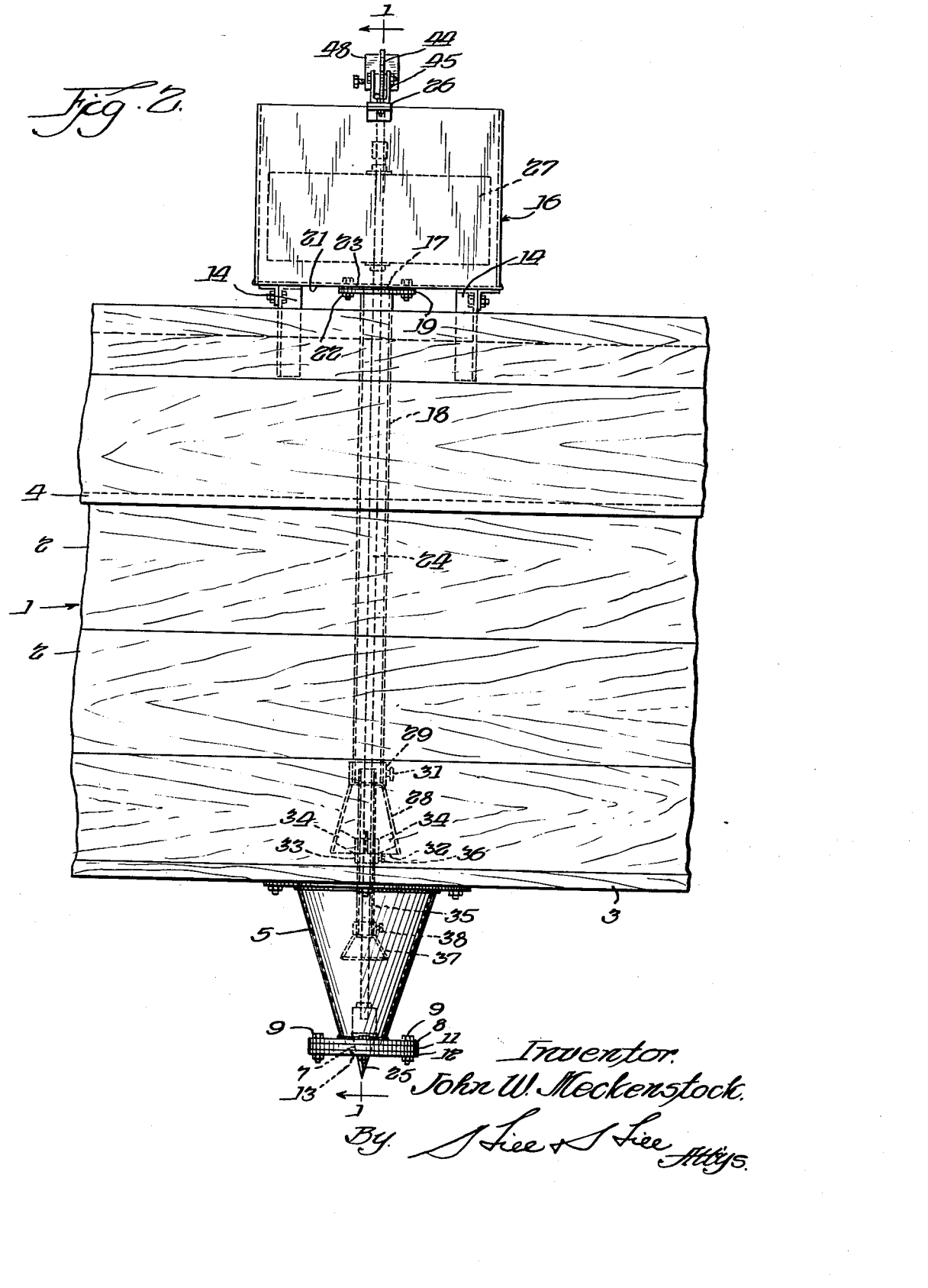
Inventor.
John W. Meckenstock.
By Lee & Lee Attys.

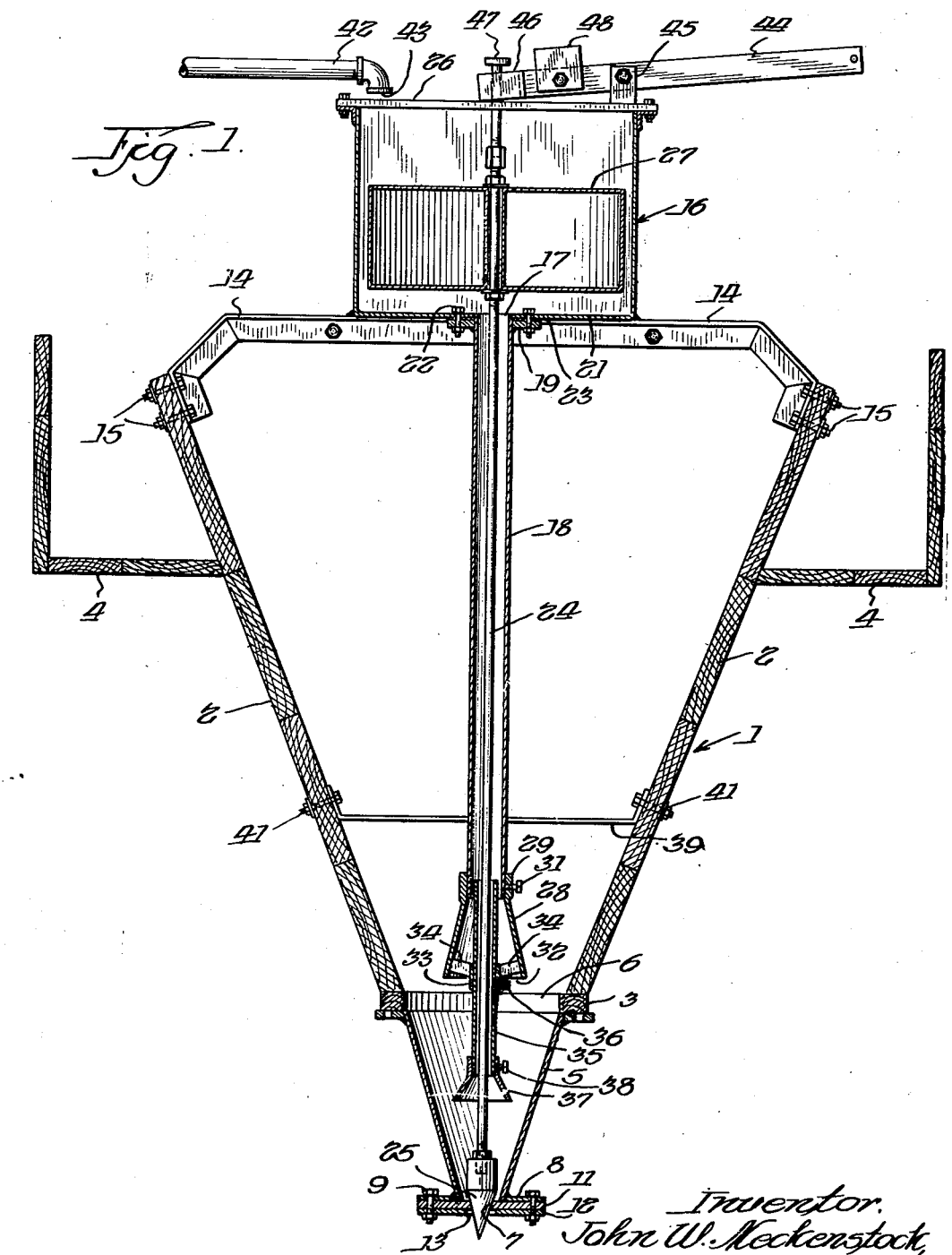

Patented May 27, 1952

2,598,409

UNITED STATES PATENT OFFICE 2,598,409

SAND VALVE

John W. Meckenstock, Chicago, Ill., assignor to Meckum Engineering, Inc., Chicago, Ill., a corporation of Illinois Application December 15, 1949, Serial No. 133,075

4 Claims. (Cl. 209—158)

1

The invention relates generally to valves and, more particularly, to a valve for discharging sand and other material from a settling flume or tank.

The invention has among its objects the production of such a valve structure which is relatively small, compact, inexpensive to manufacture, and very efficient for the purposes intended.

Another object of the invention is the production of such a valve of the float actuated type which is designed for easy actuation whereby a relatively small float may be employed to actuate the same.

A further object of the invention is the production of such a valve structure which may be readily adjusted whereby the same is capable of operation over a relatively wide range of operational characteristics.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts:

Fig. 1 is a sectional view of the valve embodying the present invention taken approximately on the line I—I of Fig. 2; and Fig. 2 is a side elevational view of the valve structure illustrated in Fig. 1.

Valves of the type here involved, as for example that illustrated in Patent No. 1,637,625, issued on August 2, 1927, to E. Shaw, operating in sand, ore, and other material, are oftentimes difficult to operate due to the packing effect of the material around the valve structure, and if float operated, oftentimes requires a relatively large float to insure satisfactory operation. The present invention is directed to a valve construction wherein the valve member may be readily actuated even where the height of the sand, or other material accumulated in the device, is such that previous valves would become very difficult to operate. It will be apparent that, with a more efficient valve action, the cycle of operation may be lengthened and a relatively small float employed, at the same time maintaining high efficiency.

Referring to the drawings, I indicates generally a portion of a settling flume, or the like, which is generally triangularly shaped in cross section, comprising side walls 2 and a bottom 3. Positioned adjacent each upper edge of the side walls 2 is a suitable overflow gutter 4, the latter and the side walls 2 in the construction illustrated being of wood, although, if desired, they could be formed of metal, or other suitable material. Secured to and extending downwardly from the bottom 3 is a material accumulating receptacle 5 formed from metal, or the like, and generally conical in shape. The member 5 communicates with the interior of the flume I through an opening 6 in the bottom 3, and is provided at its lower end with a discharge orifice 7. In the embodiment of the invention illustrated, the member 5 is provided adjacent its lower end with an outwardly extending annular flange 8 to which are secured, by bolts 9 or the like, plates 11 and 12, plate 11 containing the orifice 7, and the retaining plate 12 having a larger opening 13 therethrough.

Mounted above the side walls 2 and supported by brackets 14, the free ends of which are secured by bolts 15 to the side walls 2, is a fluid tank, indicated generally by the numeral 16, the latter being secured to the brackets 14 by any suitable means. The tank 16 is provided with a fluid discharge port 17 to which is secured a downwardly extending pipe or conduit 18, the latter, in the construction illustrated, being provided with an external annular flange 19 adjacent its upper end secured to the bottom 21 of the tank 16 by bolts 22, a gasket 23 being interposed between the adjacent surfaces of the tank bottom and the flange.

Positioned concentrically within the conduit 18 is a valve rod 24, the lower free end of which is provided with a conically-shaped valve member 25 adapted, in its lower position, to enter and close the orifice 7, as illustrated in Fig. 1. The upper end of the rod 24 extends through a guide member 26 suitably secured at its ends to the side walls of the tank 16, and mounted on the rod 24 and movable therewith is a hollow float member 27 positioned in the tank 16.

The lower end of the tube or conduit 18 is provided with a flared sleeve member 28 having a collar 29 encircling the conduit 18 and secured thereto by a set screw 31, or other suitable means, with the body of the member 28 flaring outwardly towards its open end 32. The member 28 is provided with a concentrically positioned sleeve 33 carried by the member 28 by means of a plurality of radially extending ribs 34, and extending through the sleeve 33 is a tube 35 of a diameter larger than that of the rod 24, but less than the diameter of the conduit 18. The tube 35 may be rigidly locked to the sleeve 33 by suitable means, such as a set screw 36 threaded into the sleeve and engageable with the tube 35, which is provided at its lower end with an outwardly flaring sleeve 37 secured to the tube by a set screw 38, or the like. It will be noted that the member 28, tube 35, and sleeve 37 may all be axially adjusted with respect to one another, and with respect to the orifice 7 and conduit 18, by means of their respective set screws. The lower end of the tube 18 may be further supported by a transverse bar or bracket 39 suitably secured to the adjacent end of the tube 18, with the bracket secured at its ends to the side walls 2 by means of bolts 41, or the like. Associated with the tank 16 and adapted to discharge water therein is a float supply pipe 42 having an outlet 43 opening in the tank 16.

In operation, water or other liquid flows along the flume between side walls 2, and sand and other material will collect in the member 5 and along the bottom 3 of the flume. Simultaneously with this action, fluid is discharged from the outlet 43 of the pipe 42 into the tank 16, where it will flow downwardly through the tube or conduit 18 and out of the outlet end 32 of the member 28, and thus mix with the liquid flowing in the flume. The amount of liquid entering the tank 16 is such that a more or less constant flow from the tank 16 into the flume is normally maintained. However, when the sand, or other material, rises around the member 28, flow through the tube 18 is decreased, causing the tank 16 to fill up, thus exerting an upward pressure on the float 27, whereby the latter will rise and, through the rod 24, lift the valve member 25 to partially open the orifice. The material accumulated in the member 5 will then be flushed through the orifice 7 until adequate liquid flow through the tube 18 is restored, causing the float 27 to lower, whereby the valve member 25 will again close the orifice 7. It will be noted that as the material fills the member 5, the tube 35 and sleeve 37 prevent such material from packing solidly around that portion of the rod 24 extending between the sleeve 37 and the member 28, so that sand in the bottom of the member 5 will be packed around merely a small portion of the rod 24, to considerably reduce the amount of force required to open the valve. Likewise, upon the initial opening of the valve, liquid will flow through the tube 18 and tube 35, discharging through the sleeve 37 substantially directly on the valve member 25 to provide very efficient flushing out around the latter.

The operational characteristics of the valve structure may be readily varied by adjusting the member 28 on the tube 18, the tube 35 with respect to the sleeve 33, and the sleeve 37 relative to the end of the tube 35. Thus the height of the material required to actuate the valve member 25 may be readily varied. Similarly the tube 35 and sleeve 37 may be readily adjusted to insure efficient opening action of the valve and flushing of the material from the member 5.

If desired, means may be provided for manually actuating the valve, the structure for accomplishing this function, in the embodiment of the invention illustrated, comprising a lever 44 pivotally supported by means of a bracket 45 on the cross member 26, with the inner end of the lever 44 being provided with a clevis 46 adapted to be positioned on opposite sides of the rod 24, the upper end of which is provided with an enlarged head 47 engageable with the clevis 46, whereby upward movement of the latter will raise the rod 24 and with it the valve 25. The lever 44 may be counterbalanced in an inoperative position, as illustrated in Fig. 1, by suitable means, such as a counterweight 48 mounted on the lever and positioned between the bracket 45 and clevis 46.

It will be noted from the above description that I have provided a valve structure which is relatively simple in construction, very efficient in operation, and in which the operating characteristics may be readily varied by simple adjustments.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a material discharge valve, a material receiving receptacle having a discharge opening in the bottom thereof, a valve member movable to open or close said opening, a rod connected at its lower end to said valve member for actuating the latter, a tubular member encircling the upper portion of said rod, a tube operatively carried by said member encircling the rod and being of less external diameter than the internal diameter of said member, the supporting juncture of said member and said tube having passageways therein to provide for the passage of water therethrough, and the lower end of said tube being positioned adjacent to but spaced from said valve member.

2. In a material discharge valve, a downwardly tapered material receiving receptacle having a discharge opening at the bottom thereof, a conical-shaped valve member movable on a vertical axis to open or close said opening, a rod connected as its lower end to said valve member for actuating the latter, a tubular member encircling the upper portion of said rod, a tube operatively carried by said member encircling the rod and being of a less external diameter than the internal diameter of said member, the supporting juncture of said member and said tube having passageways therein to provide for the passage of water therethrough, and the lower end of said tube being positioned adjacent to but spaced from said valve member.

3. In a material discharge valve, a material receiving receptacle having a discharge opening in the bottom thereof, a valve member movable to open or close said opening, a rod connected at its lower end to said valve member for actuating the latter, a tubular member encircling the upper portion of said rod, a downwardly flared sleeve slidably mounted on said member adjacent the lower end thereof, a tube carried by and axially movable relative to said sleeve, said tube encircling said rod and being of a less external diameter than the internal diameter of said member, the supporting juncture of said member and said tube having passageways therein to provide for the passage of water therethrough, and the lower end of said tube terminating in a downwardly flaring collar slidably mounted on said tube and positioned adjacent to but spaced from said valve member, and means for maintaining said sleeve, tube, and collar in any of their relative adjusted positions with respect to said tubular member.

4. In a material discharge valve, a downwardly tapered material receiving receptacle having a discharge opening in the bottom thereof, a conical-shaped valve member movable on a vertical axis to open or close said opening, a rod connected at its lower end to said valve member for actuating the latter, a tubular member encircling the upper portion of said rod, a downwardly flared sleeve slidably mounted on said member adjacent the lower end thereof, a tube carried by and axially movable relative to said sleeve, said tube encircling said rod and being of less external diameter than the internal diameter of said member, the supporting juncture of said member and said tube having passageways therein to provide for the passage of water therethrough, and the lower end of said tube terminating in a downwardly flared collar slidably mounted on said tube and positioned adjacent to but spaced from said valve member, and means for maintaining said sleeve, tube, and collar in any of their relative adjusted positions with respect to said tubular member.

JOHN W. MECKENSTOCK.

REFERENCES CITED

The following references are of record in the file of this patent:

UNITED STATES PATENTS

| Number | Name | Date |
|---|---|---|
| 1,637,625 | Shaw | Aug. 2, 1927 |
| 2,230,782 | Maust | Feb. 4, 1941 |
| 2,340,246 | Linch | Jan. 25, 1944 |